(12) United States Patent  
Shaw et al.

(10) Patent No.: US 8,782,186 B2
(45) Date of Patent: Jul. 15, 2014

(54) SYSTEMS AND METHODS FOR ADDRESSING MANAGED ELEMENTS

(75) Inventors: Christina M. Shaw, Cupertino, CA (US); Roger E. Tipley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2751 days.

(21) Appl. No.: 11/496,144

(22) Filed: Jul. 31, 2006

(65) Prior Publication Data

US 2008/0028058 A1    Jan. 31, 2008

Related U.S. Application Data

(60) Provisional application No. 60/735,750, filed on Nov. 12, 2005.

(51) Int. Cl.
*G06F 15/173* (2006.01)
*G06F 15/177* (2006.01)

(52) U.S. Cl.
USPC .......................................... 709/223; 709/220

(58) Field of Classification Search
USPC .................................. 707/802; 709/223, 220
See application file for complete search history.

(56) References Cited

U.S. PATENT DOCUMENTS

| 7,506,264 | B2 * | 3/2009 | Polan ............................ 715/757 |
| 7,665,071 | B1 * | 2/2010 | Roles et al. ................... 717/130 |
| 2002/0070936 | A1 * | 6/2002 | Oikawa et al. ................ 345/440 |
| 2004/0039745 | A1 * | 2/2004 | Evans et al. ................... 707/100 |
| 2004/0230317 | A1 * | 11/2004 | Kumar et al. ...................... 700/1 |
| 2006/0224428 | A1 * | 10/2006 | Schmidt et al. .................... 705/8 |
| 2006/0224702 | A1 * | 10/2006 | Schmidt et al. ............... 709/219 |
| 2007/0033273 | A1 * | 2/2007 | White et al. ................... 709/223 |

* cited by examiner

*Primary Examiner* — Minh-Chau Nguyen

(57) ABSTRACT

Systems and methods for managing information technology (IT) resources determine the physical location of at least one managed element using a property of the at least one managed element, wherein the managed element is assigned a unique name within a container and the property specifies a value that indicates the physical location of the managed element within the container, further wherein the value is provided in a format that is standardized for the type of container.

27 Claims, 12 Drawing Sheets

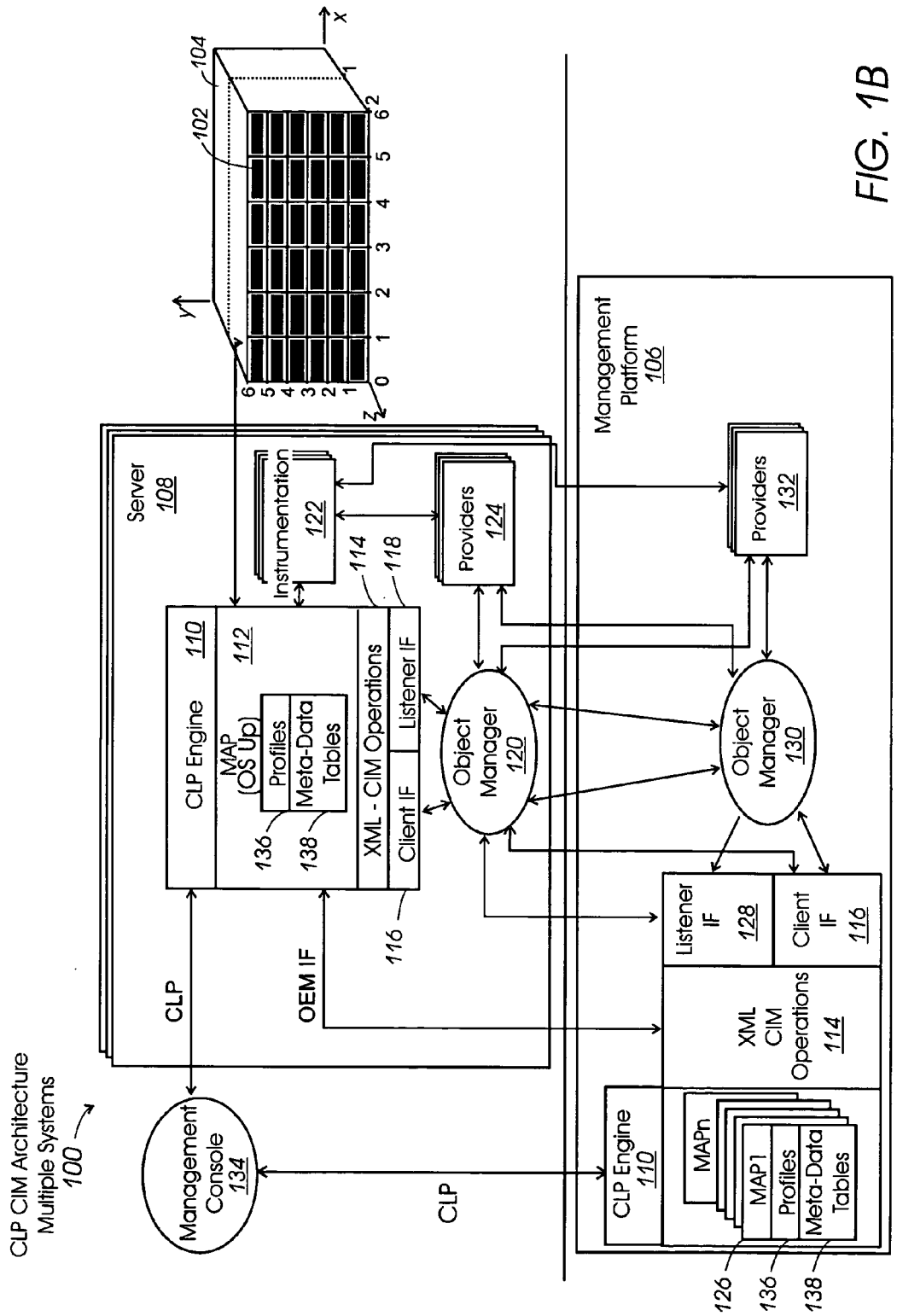

MAP Table

500 ⟶

| MAP Name | Protocols and Versions Supported | CIM Versions Supported | Object Manager Namespace Handle |
|---|---|---|---|
|  |  |  |  |

*FIG. 5A*

System Table

510 ⟶

| Index Key | System UFN | System Type Key | Instance Table | Partitioned |
|---|---|---|---|---|
|  |  |  |  |  |

*FIG. 5B*

Instance Table

520 ⟶

| Index Key | Class Name Key | User Friendly Tag | CIM Key | Property Provider Key | Association Table |
|---|---|---|---|---|---|
|  |  |  |  |  |  |

Association Table

| Index Key | Class Name Key | User Friendly Tag | Instance Key | Target Instance's Role | Property Provider | Foreign System Pointer |
|---|---|---|---|---|---|---|
|  |  |  |  |  |  |  |

Class Name Table

| Index Key | User-Friendly Class Tag | CIM Class Name |
|---|---|---|
|  |  |  |

Property Name Table

| Index Key | CIM Property Name | Property User Friendly Tag | Data Type |
|---|---|---|---|
|  |  |  |  |

*FIG. 5F*

Association Roles Table

560

| Index Key | CIM Association Roles |
|---|---|
|  |  |

FIG. 5G

Property Provider Table

570

| Index Key | Property Provider Exe | Optional Information |
|---|---|---|
|  |  |  |

FIG. 5H

SYSTEMS AND METHODS FOR ADDRESSING MANAGED ELEMENTS

BACKGROUND

Today, information technology (IT) resources are managed using a variety of incompatible and often proprietary interfaces and protocols. Requirements for management information regarding the resources need to be specifically programmed to address new resources and in many cases the specific programming is not updated as new versions of the managed elements become available.

The problem of managing disparate managed elements is becoming more acute as systems are increasingly developed using managed elements that are deployed in remote locations and accessed via information networks, such as the Internet. Generally, the resources to be managed are not readily identifiable when the resources are highly distributed and independent of one another. Further, it is difficult to obtain information regarding properties and attributes of the resources, and protocols for exchanging management information with the resources. A further difficulty lies in determining the relationships among the resources used in a system to pinpoint operational problems when one or more of the resources do not respond as expected.

In today's high density data centers (HDDC) that support computing on demand and dynamic adaptive infrastructures, the complexity imposed on the data center supervisor to create and maintain a plethora of proprietary scripts and commands is not sustainable. The complexity and speed of dynamic change experienced in today's HDDC require that hardware vendors standardize the command set used to configure, boot and re-provision the hardware, software, and other managed elements.

SUMMARY

In some embodiments, a system for locating physical components in a data center determines the physical location of at least one managed element using a property of the at least one managed element, wherein the managed element is assigned a unique name within a container and the property specifies a value that indicates the physical location of the managed element within the container, further wherein the value is provided in a format that is standardized for the type of container.

Various other features and advantages of embodiments of the invention will be more fully understood upon consideration of the detailed description below, taken together with the accompanying figures.

BRIEF DESCRIPTION OF THE FIGURES

FIGS. 1A and 1B show diagrams of an embodiment of a system for managing one or more managed elements;

FIGS. 5A-5H show embodiments of tables that can be used in the system of FIG. 1A including MAP table, System table, Instance table, Association table, Class Name table, Property Name table, Association roles table, and Property Provider table, respectively.

DETAILED DESCRIPTION OF THE FIGURES

Systems and methods disclosed herein specify embodiments of a common command line syntax and/or message protocol for managing computer resources in various distributed and local environments, such as Internet, enterprise, and service provider environments. In some embodiments, unique indices to instances of an object class are generated that enable consistent addressing across different types of computer resources. The addressing protocol is interoperable among various implementations, CPU architectures, chipsets, and vendor/operating environments.

Architecture

Figure 1A:
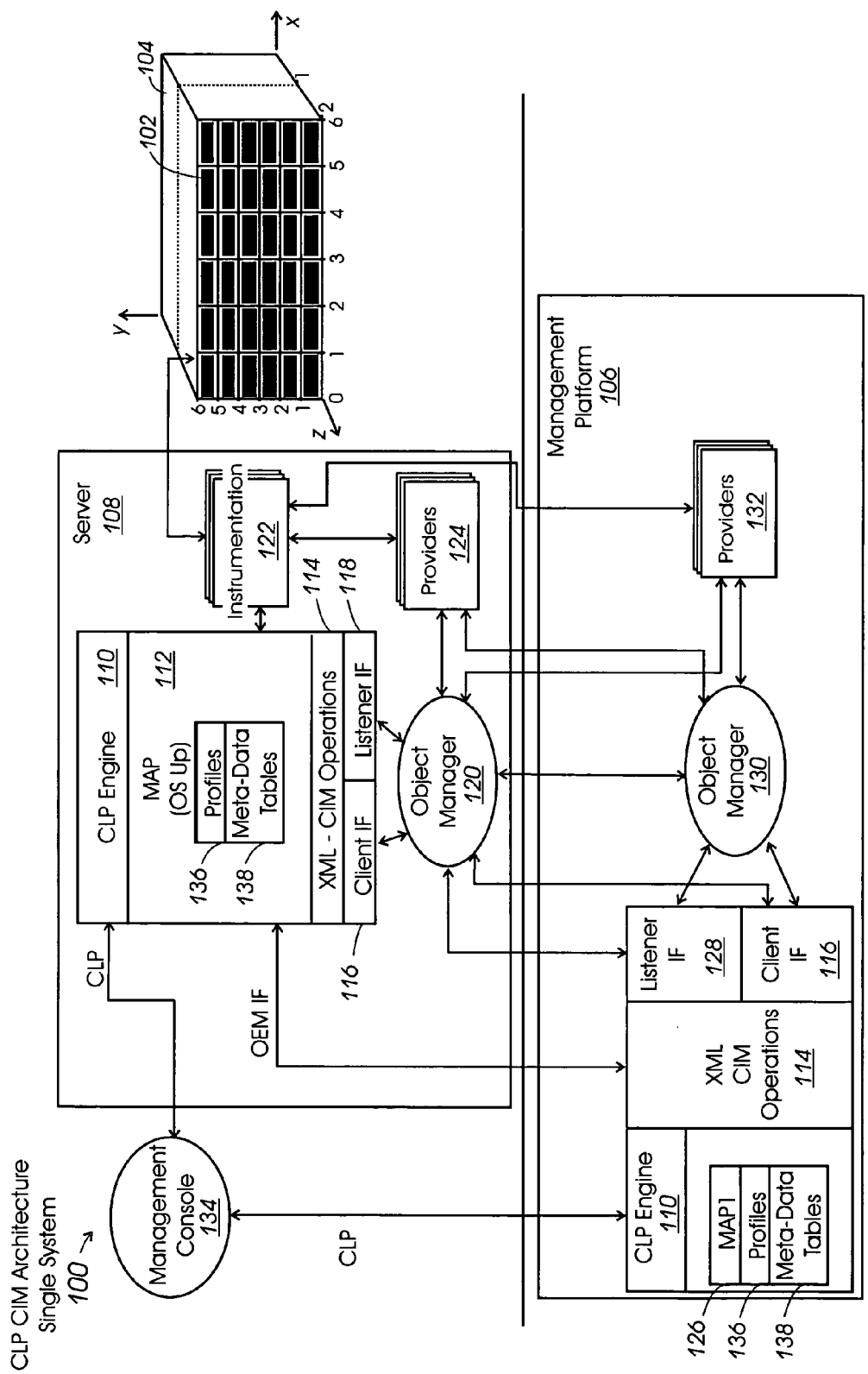

Referring to FIG. 1A a diagram of an embodiment of a system 100 for managing one or more managed elements 102 is shown. Two or more managed elements 102 can be positioned in container 104, but may also be stand-alone resources. System 100 can include various types and sizes of containers 104. Similarly, various types and sizes of managed elements 102 can be included in container(s) 104. Management platform 106 is configured to communicate with managed elements 102 to maintain and update information related to the management of managed elements 102, such as inventory and operational status. Managed devices 102 can include any suitable type of computer-related resource, such as power supply, storage devices, firmware, software, and hardware product devices, among others. In some implementations, management platform 106 is built into the server 108, and is often called a service processor or management processor. In other implementations, management platform 106 is a separate computer system, and may be used to manage one or more servers 108, as shown in FIG. 1B.

Although various embodiments discussed herein use the Common Information Model (CIM) for managing managed elements 102, it is anticipated that systems and methods disclosed herein can be implemented using other models and standards in addition to, or instead of, CIM to manage elements 102.

As described in the "CIM Tutorial" by the Distributed Management Task Force, (http://www.wbemsolutions.com/tutorials/CIM/ [June 2003]), the CIM is a model for describing overall management information in a network/enterprise environment. CIM is comprised of a Specification and a Schema. The Specification defines the details for integration with other management models, while the Schema provides model descriptions for systems, application programs, networks, and Devices. The CIM Schema enables application programs from different developers on different platforms to describe management data in a standard format so that information can be shared among a variety of application programs.

In some embodiments, an Extensible Markup Language (XML)-CIM Encoding Specification defines XML elements, written in Document Type Definition (DTD) format, which can be used to represent CIM classes and instances. Information can be transferred between management platform 106 and one or more servers 108 using the XML elements. XML-CIM Operations 114 defines a mapping of CIM operations onto Hypertext Transfer Protocol (HTTP) that allows implementations of CIM to interoperate in an open, standardized manner. Note that other protocols can be used for communication between server 108 and management platform 106.

In the embodiment shown in FIGS. 1A and 1B, server system 108 is configured to execute logic associated with Command Line Protocol (CLP) engine 110; management access point (MAP) 112; XML to CIM operations 114, client interface(s) 116, listener interface(s) 118, object manager 120, instrumentation 122, and providers 124. Note that one or more servers systems 108 with different types of managed elements 102 and containers 104 can be included in system 100.

Instrumentation 122 can be used to get information about a managed element 102. In some embodiments, instrumentation 122 can be implemented as Windows Management Instrumentation (WMI), which is a component of the Windows Operating System by Microsoft Corporation of Redmond, Wash.

Management platform 106 is configured to execute logic associated with Command Line Protocol (CLP) engine 110, one or more management access points (MAP) 126, XML to CIM operations 114, client interface(s) 116, listener interface(s) 128, object manager 130, and providers 132.

Object manager 130 can be implemented as part of management platform 106 and is assumed to be available regardless of the operational state of server 108 (e.g., stopped, running, faulted, etc.) Object manager 120 can be implemented as part of server 108 and may be unavailable if server 108 is not operating. Upon request, object managers 120 and 130 can perform operations to determine the position of managed elements 102 in their respective containers 104, and support management of managed elements 102 through the agency of MAP(s) 112 and/or 126.

Containers 104 are often configured to hold one or more rows and/or columns of managed elements 102, analogous to a one, two, or three dimensional table or x, y, z Cartesian coordinate system. Various types of devices can be used as containers 104, such as equipment racks, slots in a chassis, positions on a printed circuit board, racks in a bay, computer-readable media for storing software, and other suitable devices configured to hold one or more managed elements 102.

The CIM Schema supplies a set of classes with properties and associations that provide a framework to organize information about managed elements 102. A core model in the CIM schema is a set of classes, associations, and properties that provide a basic vocabulary for describing managed elements 102. Some of the classes use a property, for example, the LocationWithinContainer property, to specify the location of managed elements 102 within containers 104. Traditionally, the properties for specifying a location include a free-form text string that describes the placement of a managed element 102, such as slot information on a hosting board, mounting site in an equipment rack, a position relative to stationary elements in a container 104, or latitude and longitude information, among others.

One problem with using free-form text strings in properties such as LocationWithinContainer to describe the location of managed elements 102 is that the descriptions are typically not suitable for automated interpretation by a computer program. Accordingly, some embodiments disclosed herein use standardized numerical co-ordinates for positions on or in container(s) 104 to describe the locations of managed element(s) 102 within a container. Note that alphanumerical, symbolic, or other suitable coordinate values can be used to indicate the location of a managed element 102.

Figure 2A:
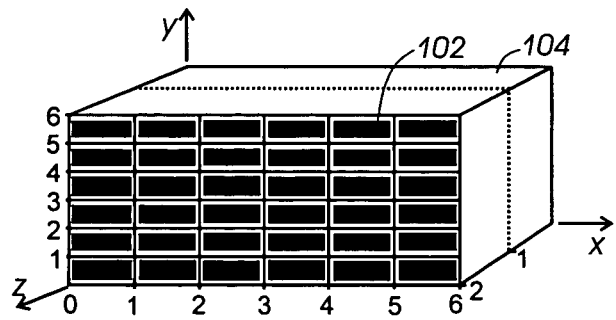
FIGS. 2A-2C show a container with information technology (IT) components locatable in a Cartesian coordinate system.
Figure 2B:
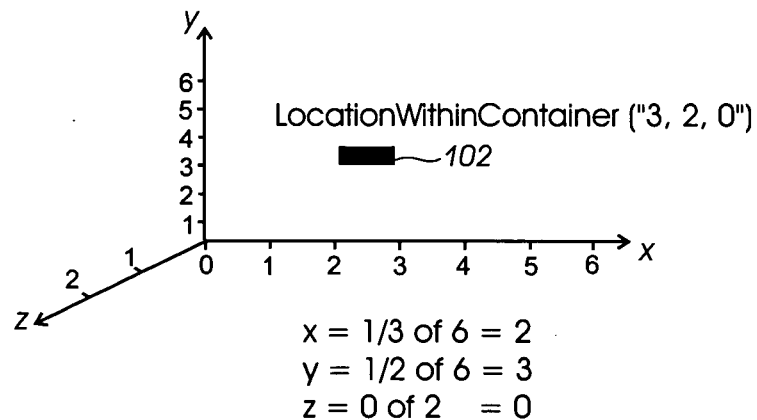
Figure 2C:
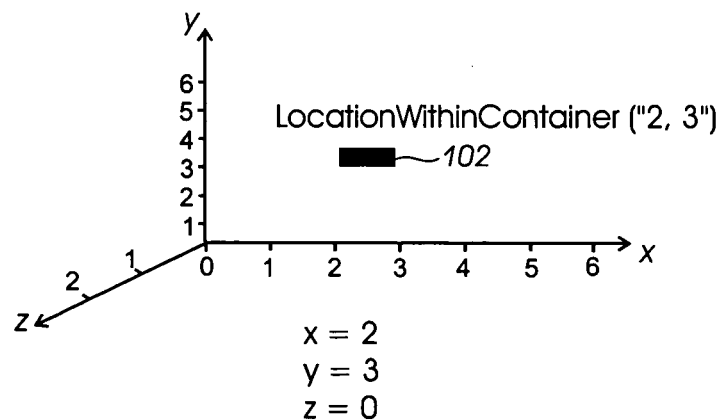

Referring to FIGS. 2A-2C, in some embodiments, the zero coordinate is located in the rear lower left hand corner of container 104 and the positions of managed elements 102 are confined to the positive x, y, z axis, as indicated by the numbers along x, y, z axes. The values provided in the text strings of the location properties can correspond to "x, y, z" coordinates or other suitable arrangement. Note that one or more coordinates may be omitted for single dimensional locations. For instance, the location description for a chassis with a single row of slots will require one dimension. Dimensional coordinates may be omitted if all managed elements 102 within a particular container 104 have the same coordinate for the dimension. A delimiter such as a comma ","

In some embodiments, coordinate(s) of the location description are used as divisors in unit ratios of corresponding axes. For example, the description "3, 2, 0" describes a managed element 102 located one third (⅓) of the way along the positive x axis, and mid-way (½) up the y axis, with no depth along the z axis, as indicated in FIG. 2B. The location description can also allow coordinates to be omitted if there is only one position along the corresponding axis.

In other embodiments, the coordinates provided in the property descriptions can be used as an index to the position/location in container 104. For example, the description "3, 2, 0" could indicate the position of a managed element 102 located in the third position along the x axis and the second position along the y axis, as indicated in FIG. 2C. A standardized implementation of the coordinates for various types of containers 104 can be agreed upon so that programs from different vendors can utilize the coordinates to accurately determine the locations of managed elements 102.

Management console 134 can issue commands to MAP 126 in management platform 106 or MAP 112 in server 108 to perform management actions on server instrumentation 122 in several different ways. As a first alternative, console 134 can issue a command to MAP 126 to use Client IF 116 on management platform 106 to access instrumentation 122 via object manager 130 and object providers 132. A second alternative can include console 134 issuing a command to access instrumentation 122 via MAP 126, Client IF 116, object manager 120, and object providers 124. A third alternative to access instrumentation 122 includes using console 134 to command MAP 126 to use Client IF 116 on management platform 106 to access object manager 130 on management platform 106, object providers 132, object manager 120 on server 108, and object providers 124. As another alternative, console 134 can command MAP 112 to use Client IF 116 on server 108 to access object manager 120, object providers 124, and then instrumentation 122. A fifth alternative uses console 134 to command MAP 112 to directly access instrumentation 122. A sixth alternative includes console 134 commanding MAP 112 to use Client IF 116 on server 108 to access object manager 120, object manager 130 on management platform 106, and object providers 132 to access instrumentation 122. A still further alternative uses console 134 to command MAP 112 to use Client IF 116 on server 108 to access object manager 120, object providers 124, and object manager 130 and object providers 132 on management platform 106 and then instrumentation 122 on server 108.

Note that in some implementations, object manager 120 on server 108 may access providers 132, and object manager 130 on management platform 106 may access providers 124.

One kind of management command that management console 134 can send to MAP 112 or 126 is a command to create an event subscription in object manager 120. If such an event subscription has been created, and instrumentation 122 detects an event, such as a failure or other event, instrumentation 122 can notify object providers 124 of the event. Object providers 124 can in turn cause object manager 120 to send an indication to listener IF 118 on server 108 and/or listener IF 128 on management platform 106. As an alternative, object manager 120 can send the event indication to object manager 130 and then to Listener IF 128.

Traditionally, one drawback to using the CIM Schema alone for resource management is that users are required to enter long, complex class names to access information about managed elements 102. Embodiments of system 100 allow user-friendly tags (UFTs) that help overcome the burden of entering long, complex class names associated with the CIM Schema. Various features of addressing schemes associated with system 100 can also adapt the CIM Schema's containment hierarchy to provide a non-ambiguous method of addressing managed elements 102 including physical elements, logical devices, services, service access points, system specific collections, and virtual systems within a single computer system, as further described herein.

XML-CIM operations 110 define how MAPs 112, 126 access object providers 124, 132 through object managers 120, 112 and create, delete, retrieve, and modify object instances. Sufficient information is stored within the containment profiles 136 and MAPs 112, 126 to construct names for managed elements 102 and allow MAPs 112, 126 to exchange instance information with instrumentation 122.

When server 108 is operating, information for managed elements 102 can be retrieved and modified using both MAPs 112, 126. When server 108 goes down, MAP 112 will not be available. A user can, however, retrieve and modify information regarding managed elements 102 from MAP 126 using CLP commands that are input to management platform 106 and passed to instrumentation 122 that remains operational even when server 108 is down. Instrumentation 122 that remains operational when server 108 goes down might include devices such as a Baseboard Management Controller (BMC) as specified by the Intelligent Platform Management Interface (IPMI) standard, version 1.5 or 2.0, or other devices. Note that server 108 may itself be a managed element 102, therefore information regarding any error conditions or faults may be available to help determine system status and whether server 108 can recover and resume operation.

Client interfaces 116 are used to communicate information between MAP 112 or 126, which perform XML-CIM operations 110, and object managers 120 and 130. Object managers 120, 130 pass commands to one of a plurality of object providers, which operate on instrumentation 122 that instruments managed elements 102. For example, when a management application requests data from object manager 120, object manager 120 uses a provider 124 to pass the request to the respective instrumentation 122. Providers 124, 132 are classes that perform functions in response to a request from object managers 120, 130, such as mapping instance data from instrumented managed elements 102 to CIM classes. Instrumentation 122 can, for example, get information from managed elements 102, pass the information to provider 132 and object manager 130 in the form of CIM classes, map the information from CIM classes to formats required by managed elements 102, get the required information from the CIM class, and pass the information to managed elements 102 in native device formats.

A client request is typically input to CLP engine 110 directly from a user by entering CLP commands or other suitable commands/protocol at management console 134. A series of commands can also be input via a script that is launched via management console 134. Requests in the form of CLP commands can also be input automatically to CLP engine 110 via a client application program (not shown) or other suitable method.

Object manager 120 or 130 calls the correct provider(s) 132, 124, which access the correct instrumentation 122 in response to the client's requests, such as creating/updating a CIM namespace, class, or instance. The provider(s) 132, 124 and instrumentation 122 processes the incoming request and return a response to the object manager 120 or 130. The object manager 120 or 130 passes the response to the client.

An event subscription can be included in object manager 120 and/or 130 that allows providers 132, 124 to generate indications, by which subscribers can be notified of the occurrence of events. An event is an occurrence in a computer system detected by instrumentation 122 to which an event monitoring application might need to respond, for example, failure of a fan or power supply in server 108.

Object managers 120, 130 and/or providers 132, 124 may poll enumerated instances of managed elements 102 at a specified polling interval to find any new, changed, or deleted instances between the two sets of enumerated instances. Object Managers 120 and/or 130 may generate an indication when a static instance is created, modified, or deleted. Providers 124, 132 can generate indications for the intrinsic events that occur in the dynamic instances of the classes they support. A subscriber can create one or more event filters with one or more event handlers. Indications of events are typically not delivered until a client creates a subscription for the events. A client application can add Listener interface 128 to register for indications of events. Object manager 120 and/or 130 can generate indications of events that are specified by an event filter when a client subscription is created.

CIM uses Object References to address objects in the CIM model. One problem is that the syntax of Object References is not concise or user friendly, and is not easily used in scripts. For example, an Object Reference can typically include over 80 characters, which is cumbersome for a user to enter manually. The abbreviation "CIMREF" for CIM Object Reference is used herein. Another problem relates to mapping command verbs to specific object types, parameters, and methods. CIM-XML Operations 110 over Hypertext Transfer Protocol (HTTP) provide a command interface to object manager 120 and 130, but it is not suitable for a user-interactive, browser session-based command line protocol. Embodiments disclosed herein solve these and other problems. Further, commands and object references are disclosed herein using Augmented BNF (ABNF) grammar notation, as specified in the Internet Engineering Task Force's (IETF's) standard RFC2234, by way of example and are not intended to limit embodiments of the invention to a particular grammar notation.

One or more profiles 136 can be defined for the addressing scheme to simplify addressing managing elements 102 and support rendering a graph of physical and logical topology of elements 102. For example, a Containment Profile can be defined to describe the legal associations to use to address a target instance. The addressing scheme further provides a unique target to accurately address managed elements 102. In some embodiments of the addressing scheme, MAPs 112, 126 implement hierarchical, logical containment, and physical containment profiles 136 for specific hardware platform types and profile components for specific manageability domains, as further described herein.

A target name is a unique user-friendly tag (UFT) or CIM Object Reference. Target names can be translated to CIM Object References and vice versa. In some embodiments, the following CLP command syntax can be used to set a target name for a session.

Set Target=[["/"] targetUFT [/targetUFT]*][CIMREF] User Friendly Tags (UFTs) can be nested to drill down to an element 102 enclosed within a system, for example, a slot in a chassis or a disk drive. Note that a slash character "/" is used in the definition above as a separator between components of the target name. Other suitable characters, such as a period ".", can also be used as separators.

There is a 1 to 1 mapping between a UFT and a CIM class name. The required class names are defined by physical and logical containment profiles 136. Tables 138 in MAPs 112, 126 store a unique UFT within the scope of each managed element 102. CIM divides its object schema into logical and physical realms. Logical entities derive from CIM_LogicalElement. Physical entities derive from CIM_PhysicalElement. Aspects of managed element 102 that are not related to a three-dimensional concrete real world existence are modeled as logical objects. A PhysicalElement is an object that occupies space and can be touched. A LogicalElement, on the other hand cannot.

For example, a ComputerSystem is a LogicalElement that comprises all the components of a computer including hardware, software, firmware, processes, file systems, internet addresses, logs, etc. A disk drive is the physical form factor (a PhysicalPackage) that encloses the logical aspects of the disk, such as storage volumes, disk partitions, and memory blocks. In CIM, only the form factor is a PhysicalPackage and all the rest including the logical entity that describes the kind of disk drive (floppy, CD, DVD, etc.) are LogicalDevices. An embodiment of a CLP command set is described in the following paragraphs. Note that other suitable commands, required elements, optional elements, return values, and error conditions, can be used in addition to, or instead of, the CLP commands listed below.

Commands

An embodiment of a CLP commands includes a Set command to apply a Setting Data instance to a target; Boot Command to bring up a Server system 108; Reset Command; Power Command; Halt Command to shut down a target instance; Show: Instance Properties Command, which returns all the supported properties of the target instance; Show: instance names Command, which returns all the names of that target type in a CIM instance (as part of metadata repository 134); Create Command, which creates an instance of the target type in MAPs 116, 124 with the values in the property list; Remove Command, which removes the target instance from MAPs 116, 124; Indications Command to manipulate IndicationFilter and ListenerDestination for events; and Subscribe Command to register to receive indications defined by IndicationFilter at ListenerDestination (default) or de-register to cancel subscription.

Note that other suitable commands, required elements, optional elements, return values, and error conditions, can be used in addition to, or instead of, the CLP commands listed.

Embodiments of addressing schemes described herein define legal targets for CLP commands and provide a human-friendly way to accurately address CIM objects (classes and instances) in metadata tables 136. In some embodiments, addresses for managed elements 102 are based on profiles 136 that specify architectural associations between managed elements 102 and management platform 106. Profiles 136 define rules and guidelines to model specific hardware platforms such as a generic base system, modular systems such as blade servers, and other architectural features such as clustering, redundancy (resource sharing) and virtual machines. Further, profiles 136 can define rules and guidelines to model specific management domains such as Boot Control, Power Control, Firmware Update, and the like.

In some embodiments, associations in profiles 136 define hierarchies in the CIM model that can be used to define specific paths to leaf or end node instances, in the same manner as a directory structure provides a hierarchical directory path to a leaf file or directory in a file system. Delimiters, such as forward slashes (/) in the address denote associations and the terms between delimiters are User Friendly Tags (UFTs). In some embodiments, there are two types of UFTs; User Friendly class Tags (UFcT) and User Friendly instance Tags (UFiT). A UFcT is typically defined for each class used in profiles 136. UFcTs provides a simple short user friendly synonym for specific a CIM class. UFiTs are built based on the instance's UFcT and addressing rules further described herein.

A new CIM Property, ManagedSystemElement.UserFriendlyTag, of type String, can be used to hold an instance's User Friendly instance Tag (UFiT). Profiles 136 simplify the complexity of the CIM model for the user and insure interoperable implementations between managed elements 102. Profiles 136 are also used by CLP engine 110 to map CLP commands to managed elements 102. CLP engine 110 uses the UFTs on the command line to target managed elements 102. A fully qualified path of UFTs allows a simple mapping of CLP targets to CIM Object References, thus providing support for communication between MAPs 112, 126 and Servers 108, Clients, and instrumentation 122. These features combine to effectively create an embedded lightweight CIM Server in MAPs 112, 126.

For each CIM class used in profiles 136 there is a 1 to 1 alias mapping to a UFT. Standard instance UFTs are derived by adding an index, such as an integer suffix, to the class UFT root. Some samples of instance UFTs include:

system, card, cpu, disk, etc.

system0 . . . 1, card0 . . . n, cpu0 . . . n, disk0 . . . n

Similarly, UFT instance names for vendor aliased classes are created by adding an index to the aliased class UFT. For example if cell is an alias for card, then instances of cell would be cell0, cell1, and so on. More than one unique alias name for an instance can be used.

The CIM standard namespace is flat. Delimiters, such as the forward slash "/" character, merely separate terms in standard CIM Object References and do not denote a directory-like structure. Therefore, CIM namespaces cannot be aggregated to allow a command to be performed on multiple managed elements 102 with one command. Further, CIM requires instance keys to be used to address instances, which are unwieldy for a human operator to enter. Accordingly, embodiments of address schemes disclosed herein are designed to be easy to use, and to provide a hierarchical namespace similar to a directory/file system. The addressing scheme provides the capability to move up and down an address path from the root to the target, and supports aggregation of namespaces by aggregating root nodes at discrete points. For example in a large data center, a single MAP 112, 126 may be responsible for a single rack. There may be several racks in the data center each being managed by a separate MAP 112, 126. An intelligent management application, such as the OpenView system by Hewlett-Packard of Palo Alto, Calif., can aggregate the namespaces of each MAP 112, 126 about a single node. As long as each aggregated MAP node has a unique tag, such as MAP1, MAP2, . . . MAPn shown in FIG. 1B, all the paths in the aggregate will be unique.

Figure 3A:
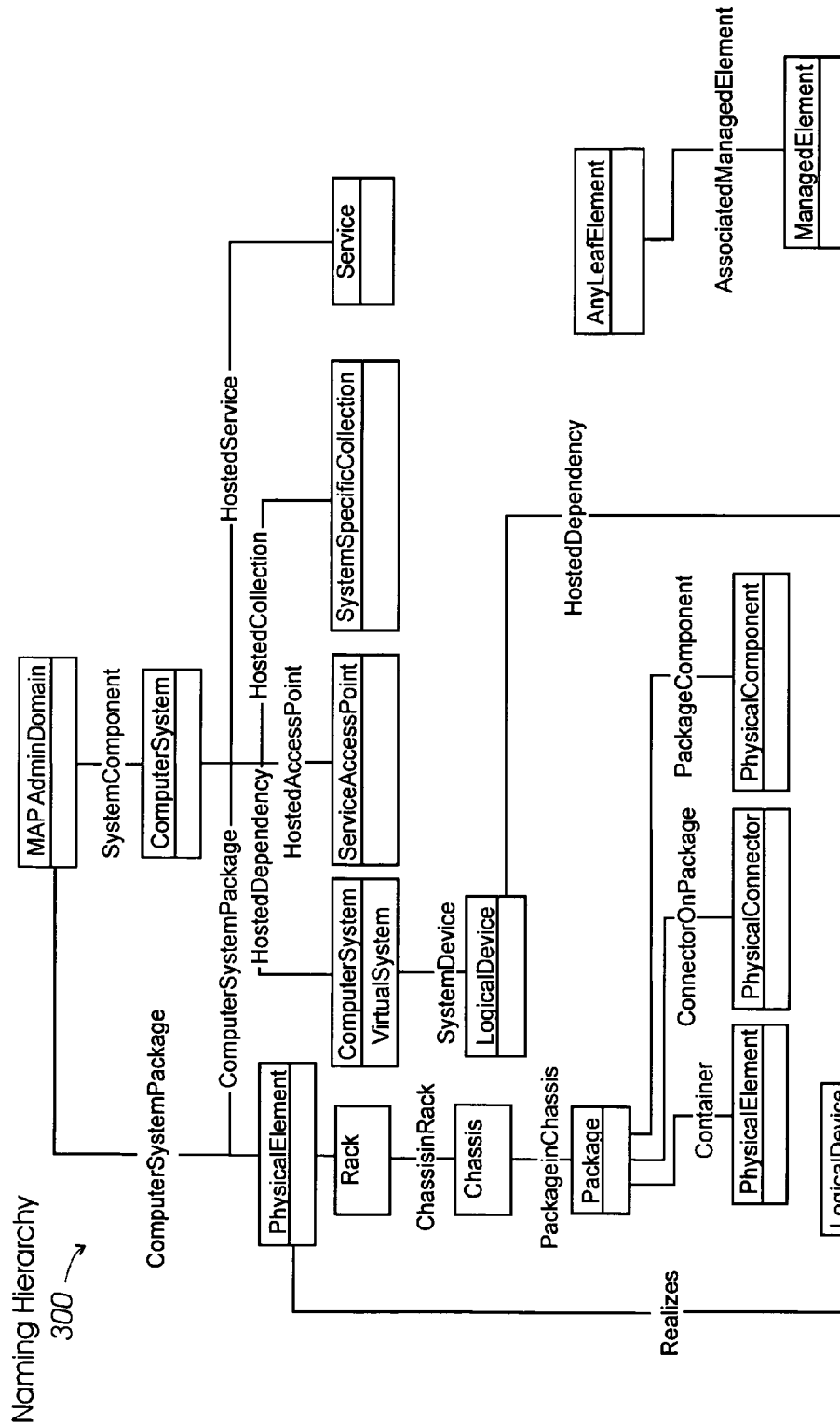
FIG. 3A shows a diagram of an embodiment of a hierarchical address namespace 300.

FIG. 3A shows a diagram of an embodiment of a hierarchical address namespace 300 that can be used in profiles 136 (FIG. 1). A legal address path is one in which each term has the appropriate intervening association and role. Legal associations between the path terms must exist at each level until the last (leaf) term is reached. The namespace is based on CIM containment rules with constraints to enforce instance uniqueness within a container.

A Physical containment profile 310 (FIG. 3B) is relied upon to address physical components and the LogicalDevices they Realize within a ComputerSystem. Addressing rules further described herein require that the name of a real LogicalDevice be unique within its hardware container (e.g. the PhysicalElement that Realizes the LogicalDevice). FIG. 3A shows a path from a virtual ComputerSystem to its LogicalDevices. The name of an instance of a virtual LogicalDevice need only be unique within its virtual ComputerSystem.

Figure 3B:
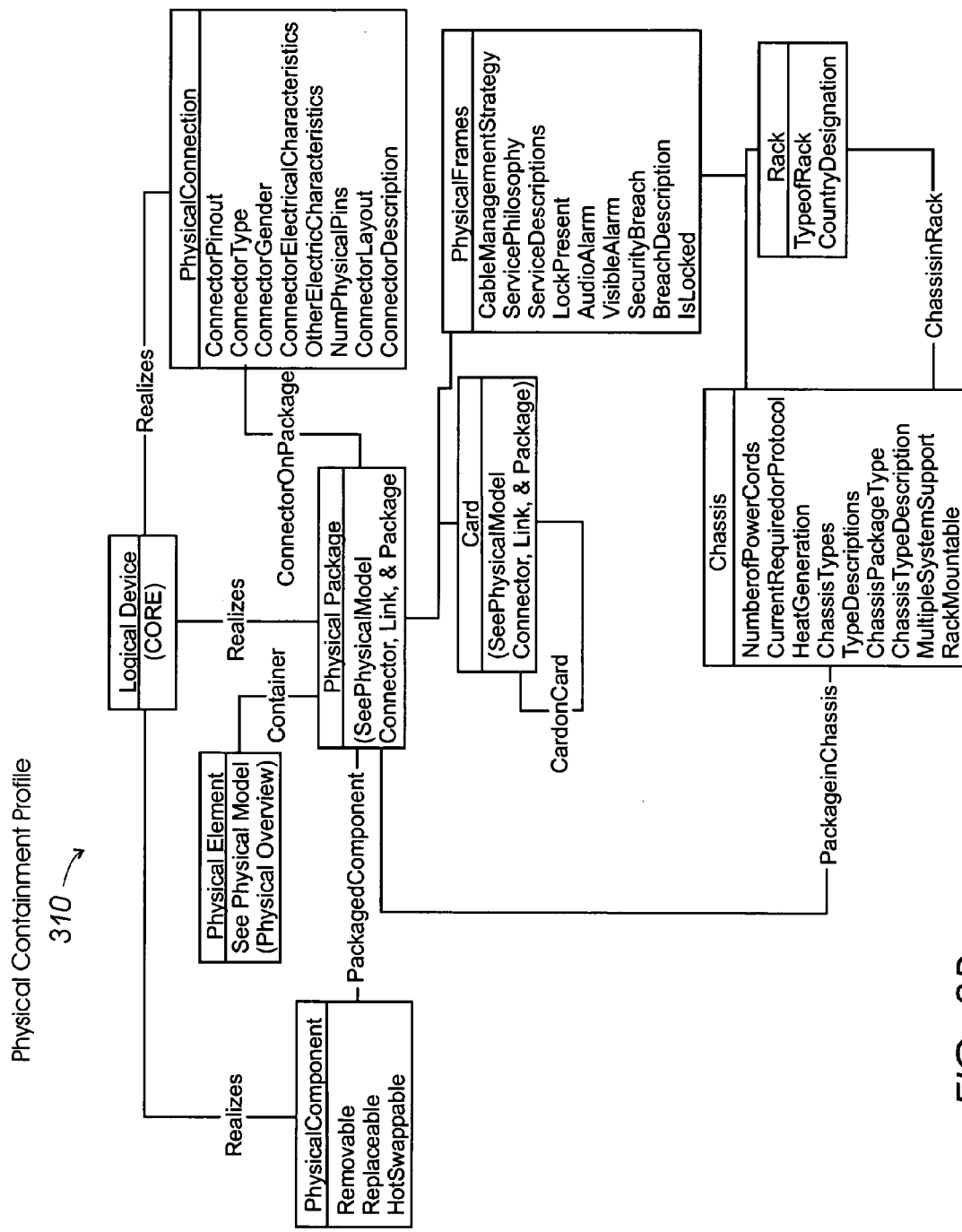
FIG. 3B shows a diagram of an embodiment of a physical containment profile.
Figure 3C:
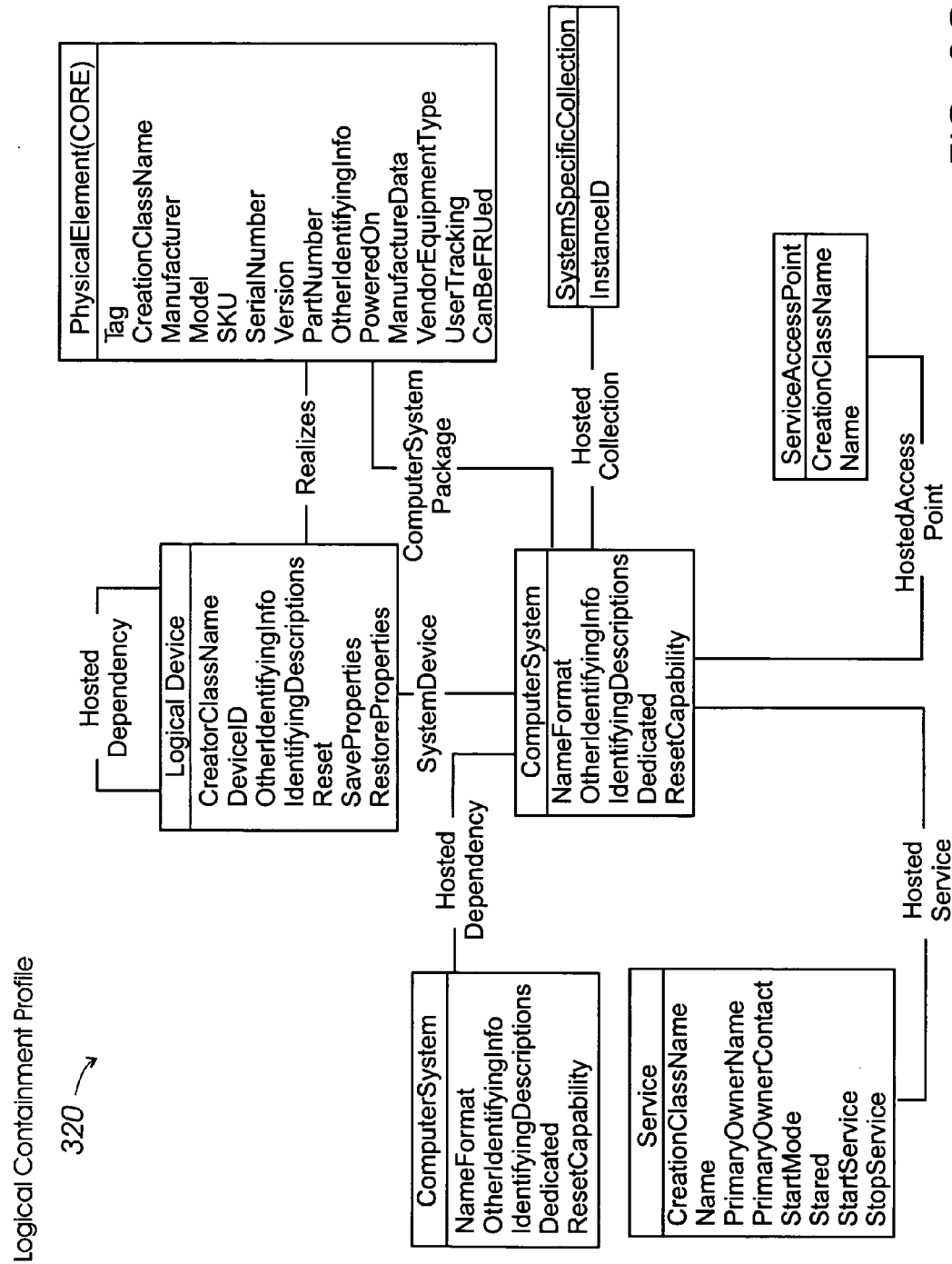
FIG. 3C shows a diagram of an embodiment of a logical containment profile.

The HostedDependency relationship in FIG. 3A provides the link to the real LogicalDevice. Notice also that the path to the "real" LogicalDevice is from the "real" ComputerSystem and ComputerSystemPackage path. Physical and logical profiles, embodiments of which are shown in FIGS. 3B and 3C, respectively, relate specific associated instance information to managed elements 102 (FIG. 1). For example, answering the question; "What firmware version is my raid1 controller using?" might involve the administrator typing in the following CLP command:

show/system1/rack1/chassis2/raid1/swid where raid1 is the raid controller and swid is the property CIM_SoftwareIdentity. This command returns the associated SoftwareIdentity for the disk array controller "raid1".

The address hierarchy shown in FIG. 3A translates profiles 136 (FIG. 1) into a hierarchical graph of related objects. Using these relationships MAPs 116, 126 (FIG. 1) can find raid1 in system1 by first finding system1 in a MAPAdminDomain using SystemComponent and then using ComputerSystemPackage to rack1 and then ChassisInRack to chassis2 and then Realizes to raid1 and finally ElementSoftwareIdentity to get all the SoftwareIdentity (firmware versions) associated with raid1. The last term is an example of using a UFcT in a path. This is equivalent to addressing all instances of the class type. In FIG. 3A, the last path component is expressed by the diagram objects in the lower right corner titled "any leaf element", "associated managed element" and "managed element". This is a short hand notation to specify that the final term in a path may be appended with any legal associated managed element 102 (FIG. 1).

Referring to FIG. 3B, a diagram showing a physical containment profile 210 that can be used in profiles 136 is shown. CIM associates PhysicalComponents, PhysicalPackages, and PhysicalConnections with a CIM Logical Device model using the Realizes relationship. Target naming leverages the rules of these relationships to uniquely address any logical device using its fully qualified containment path. For example:

```
Rack <- ChassisInRack <-Chassis <- PackageInChassis <-
    PhysicalPackage
    <- PackagedComponent <- PhysicalComponent
        <- Realizes <- LogicalDevice
    <-ConnectorOnPackage <- PhysicalConnector
        <- Realizes <- LogicalDevice
or
    <-Container <- PhysicalElement
        <- Realizes <- LogicalDevice
```

A single Rack may contain 0 . . . n Chassis; a single Chassis may contain 0 . . . n Packages; a single Package may contain 0 . . . n Components or Connectors or PhysicalElements. A PhysicalElement Realizes a LogicalDevice so any PhysicalElement by association may "contain" a LogicalDevice.

Properties are defined for elements of containment profile 310. For example, properties of PhysicalComponents can include:
    Removable,
    Replaceable, and
    Hot Swappable.
Properties of PhycicalConnections can include:
    ConnectionPinout,
    ConnectorType,
    ConnectorGender,
    ConnectorElectricalCharacteristics,
    OtherElectricCharacteristics,
    NumPhysicalPins,
    ConnectorLayout, and
    ConnectorDescription.
Properties of PhysicalFrames can include:
    CableManagementStrategy,
    ServicePhilosophy,
    ServiceDescriptions,
    LockPresent,
    AudioAlarm,
    VisibleAlarm,
    SecurityBreach,
    BreachDescription, and
    IsLocked.
Properties of Chassis can include:
    NumberofPowerCords,
    CurrentRequiredorProtocol
    HeatGeneration,
    ChassisTypes,
    TypeDescriptions,
    ChassisPackageType,
    ChassisTypeDescription,
    MultipleSystemSupport, and
    RackMountable.
Properties of Rack can include:
    TypeofRack, and
    CountryDesignation.
Note that other suitable properties can be used in addition to, or instead of, the properties disclosed herein.

A PhysicalElement is one of CIM_Package (Frame, Rack, and Chassis), CIM_Component, CIM_connector, or CIM_link. A package may contain any PhysicalElement thus the containment is recursive. A Chassis is a package and so it may be "in a" chassis thus the hardware hierarchy is n deep. The physical containment profile 310 is suitable to model any arbitrary computer hardware topology.

A PhysicalElement is contained in at most one container. The CIM associations prescribe how containers are ordered. The specific association is never ambiguous because it is inherent in the instance. That is, a PhysicalElement instance can have only one containment association. If a chassis is in a rack, it will be the Chassis CIMREF in ChassisInRack. If a chassis is in a package it will be the Package CIMREF in PackageInChassis, but not both PackageInChassis and ChassisInRack. MAPs 112, 126 (FIG. 1) link a device instance to its physical container instance via the instances' Realizes association information. For example consider a target name in the following form:

/systemUFT/rackUFT/chassisUFT/packageUFT/(PE or connector or component-Rdevice)UFT where xxxUFT is the User Friendly Name (UFT) of the instance, as further described herein. If the UFT instance name is unique within its container, the target path addresses at most a single unique instance. The associated instance information is obtained using the target instance's associations. That is, the specific instance, rackUFT, has a ChassisInRack association with the specific chassisUFT wherein the rackUFT is the GroupComponent and the chassisUFT is the Part Component.

Referring to FIG. 3C, a diagram of logical containment profile 320 that can be used in profiles 136 (FIG. 1) is shown with elements LogicalDevice, ComputerSystem, Service, PhysicalElement, SystemSpecificCollection, and ServiceAccessPoint. Associations between the elements can include Hosted Dependency, Hosted Service, System Device, Hosted Access Point, Hosted Collection, Computer System Package, and Realizes.

By definition, a single computer system may contain 0 ... n services; 0 ... n service access points; 0 ... n system specific collections; and 0 ... n virtual systems that contain 0 ... n logical devices that may have HostedDependency associations to real logical devices. The containment rules guarantee that a virtual device will not have a Realizes association to a physical element and that it will be in the dependent role of the HostedDependency. Properties are defined for elements of logical containment profile 320. For example, properties of LogicalDevice can include:
 CreatorClassName,
 DeviceID,
 OtherIdentifyingInfo,
 IdentifyingDescriptions,
 Reset,
 SaveProperties, and
 RestoreProperties.
Properties of PhysicalElement can include:
 Tag,
 CreationClassName,
 Manufacturer,
 Model,
 SKU,
 Serial Number,
 Version,
 Part Number,
 OtherIdentifyingInfo,
 PoweredOn,
 ManufactureData,
 VendorEquipmentType,
 UserTracking, and
 CanBeFRUed.
Properties of ComputerSystems can include:
 NameFormat,
 OtherIdentifyingInfo,
 IdentifyingDescriptions,
 Dedicated, and
 ResetCapability.
Properties of Services can include:
 CreationClassName,
 Name,
 PrimaryOwnerName,
 PrimaryOwnerContact,
 StartMode,
 Stared,
 StartService, and
 StopService.
Properties of ServiceAccessPoint can include:
 CreationClassName, and
 Name.
Properties of SystemSpecificCollection can include:
 InstanceID.

Physical containment profile 310 (FIG. 3B) is relied upon to uniquely address physical components and "real" logical devices within a ComputerSystem. Names of real devices must be unique within their hardware container (e.g. the PhysicalElement that Realizes the LogicalDevice). Names of virtual devices must be unique within their virtual system. Specific associated instance information is obtained using the target instance's associations. Hierarchical profile 300 and containment profiles 310, 320 define the associations supported by MAPs 112, 126 (FIG. 1).

Some embodiments of MAPs 112, 126 utilize grammar rules to form fully qualified target names. FIGS. 4A-4G show an embodiment of target name grammar production rules using Unified Modeling Language (UML) diagrams of the legal CIM containment associations between target instance names. Associations that appear first have precedence. Note that the grammar rules depicted in FIGS. 4A-4G can be implemented in one or more metadata tables 138 or other suitable data structure.

Figure 4A:
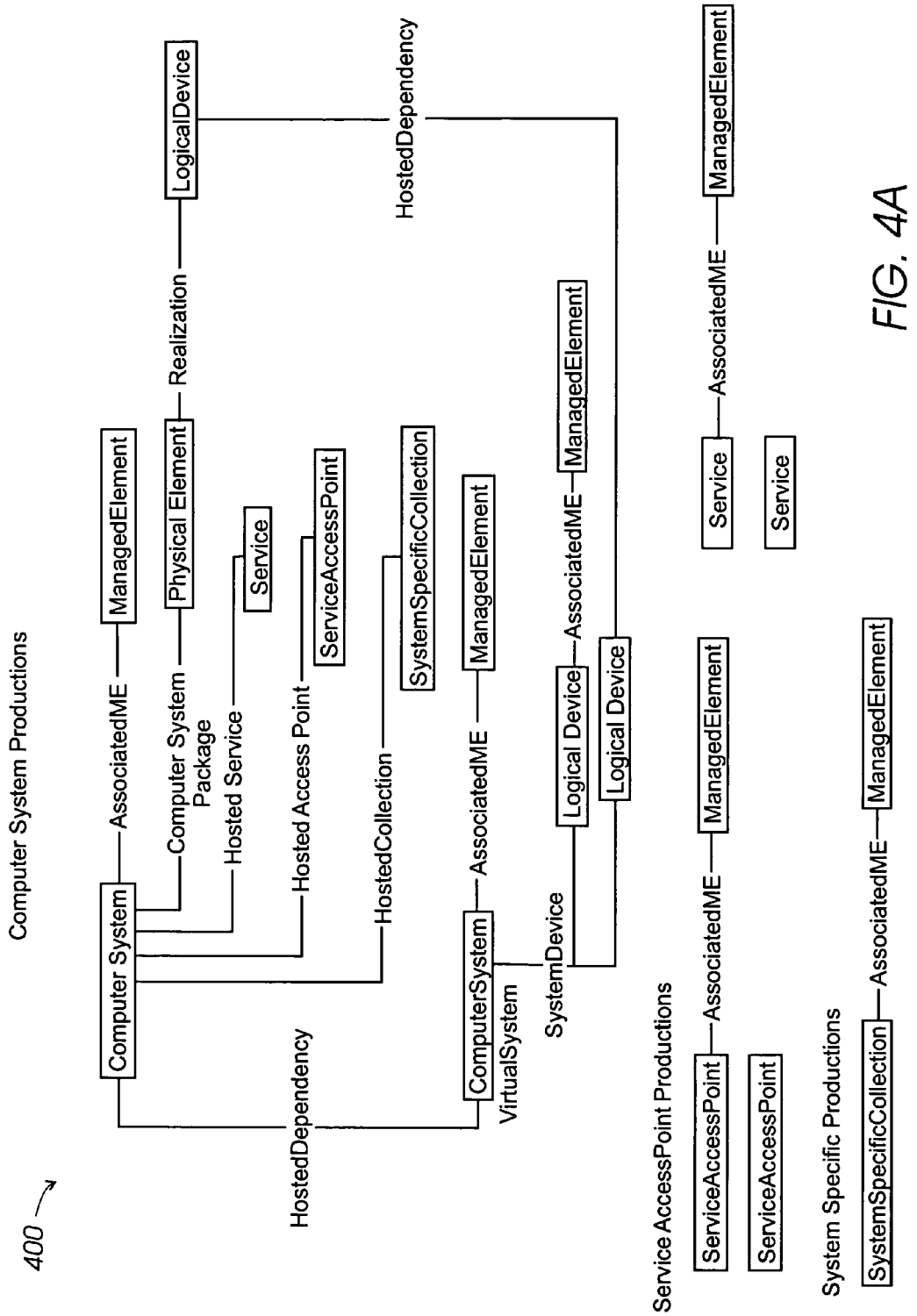
FIGS. 4A-4J show an embodiment of a Naming Grammar using Unified Modeling Language (UML) diagrams of the legal CIM containment associations between target instance names.

The grammar production rules and notation outlined below are defined in Augmented Backus-Naur Form (ABNF), which defines a set of rules for a formal unambiguous machine parsable grammar developed by the Internet Engineering Task Force (IETF), as set forth in IETF Specification RFC2234. The grammar rules can be implemented as follows:

FIG. 4A shows an embodiment of allowable Computer System, Service Access Point, and System Specific productions, which in ABNF notation, are defined as:

```
target = "/" "CIM_ComputerSystem" [ "/" ComputerSystemPackage /
   HostedService / HostedAccessPoint / HostedCollection /
   HostedDependency / AssociatedME ]
HostedService = "CIM_Service"
HostedService =/ "CIM_Service" "/" AssociatedME
HostedAccessPoint = "CIM_ServiceAccessPoint"
HostedAccessPoint =/ "CIM_ServiceAccessPoint" "/" AssociatedME
HostedCollection = "CIM_Collection"
HostedCollection =/ "CIM_Collection" "/" AssociatedME
HostedDependency = "CIM_ComputerSystem"
HostedDependency =/ "CIM_ComputerSystem" "/" AssociatedME
HostedDependency =/ "CIM_ComputerSystem" "/" SystemDevice
HostedDependency =/ "CIM_ComputerSystem" "/" SystemDevice "/"
    AssociatedME
AssociatedME =/ ... Enumeration of the specific associations supported
in the implemented Profiles. This section will be completed according to
the adopted profiles. For example,
AssociatedME = AssociatedPower
AssociatedME =/ AssociatedPowerService
AssociatedME =/ ElementSettingData
AssociatedME =/ ControlledBy
AssociatedPower = "CIM_PowerSupply"
AssociatedPowerService = "CIM_PowerService"
ElementSettingData = "CIM_SettingData"
ControlledBy = "CIM_Controller"
SystemDevice = Device
Device =/ .. Enumeration of the specific devices supported in the
implemented Profiles. This section will be completed according to the
adopted profiles. For example,
Device = "CIM_PowerSupply"
Device =/ "CIM_Cpu"
Device =/ "CIM_Controller"
ComputerSystemPackage = PhysicalElement
```

Figure 4D:
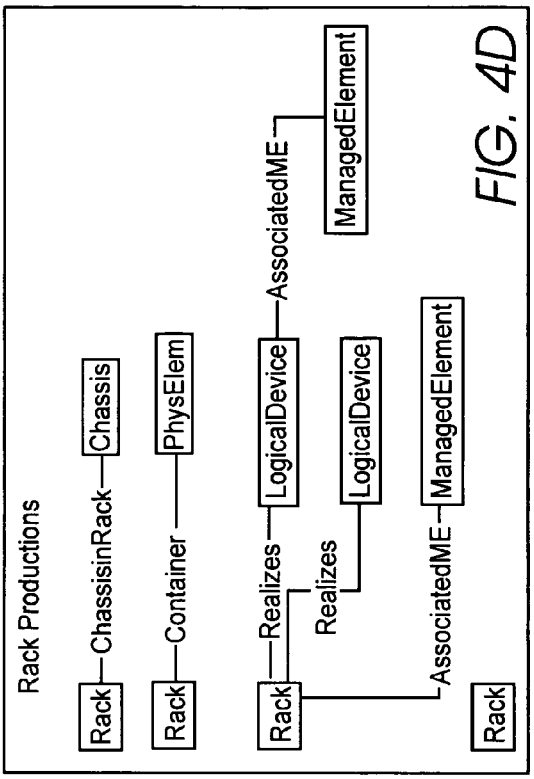
Figure 4E:
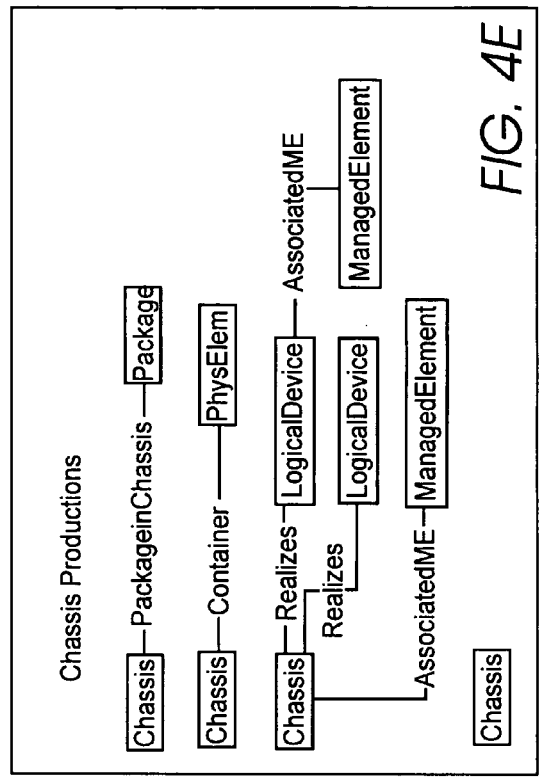
Figure 4B:
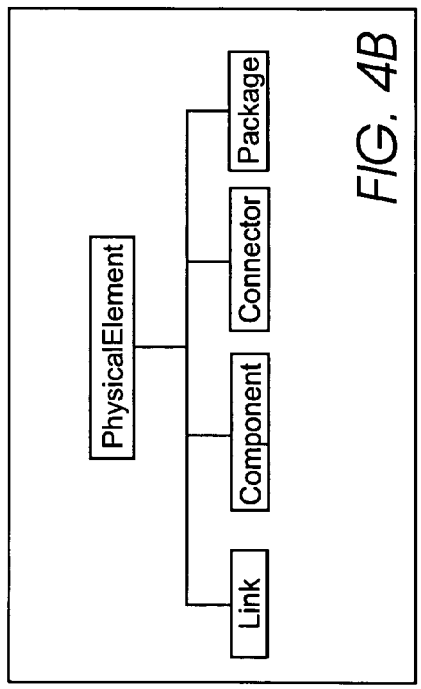

FIG. 4B shows an embodiment of a hierarchy of PhysicalElements, defined in ABNF format as:

```
PhysicalElement = Component
PhysicalElement =/ Connector
PhysicalElement =/ Link
PhysicalElement =/ Package
```

Figure 4C:
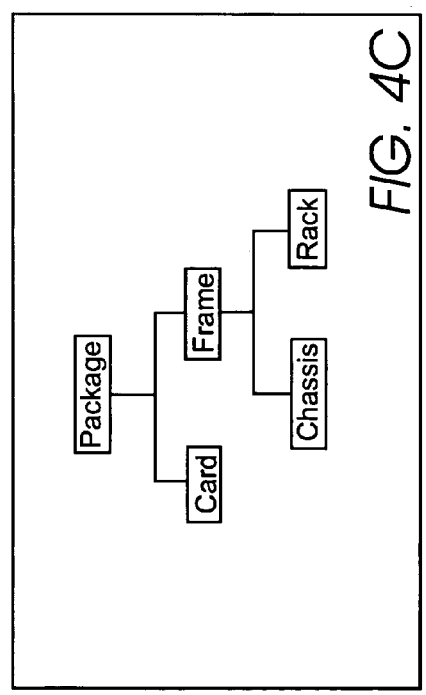

FIG. 4C shows an embodiment of a hierarchy of Packages, defined in ABNF format:

```
Package = Card
Package =/ Frame
Package =/ Rack
Package =/ Chassis
```

FIG. 4D shows an embodiment of allowable Rack productions, defined in ABNF format as:

```
Rack = "CIM_Rack" "/" ChassisInRack
Rack =/ "CIM_Rack" "/" Container
Rack =/ "CIM_Rack" "/" Realizes
Rack =/ "CIM_Rack" "/" AssociatedME
Rack =|/ "CIM_Rack"
ChassisInRack = Chassis
Container = PhysicalElement
Realizes = Device
Realizes =/ Device "/" AssociatedME
```

FIG. 4E shows an embodiment of Chassis productions, defined in ABNF format as:

```
Chassis = "CIM_Chassis" "/" PackageInChassis
Chassis =/| "CIM_Chassis" "/" Container
Chassis =/ "CIM_Chassis" "/" Realizes
Chassis =/ "CIM_Chassis" "/" AssociatedME
Chassis =/ "CIM_Chassis"
PackageInChassis = Package
```

Figure 4F:
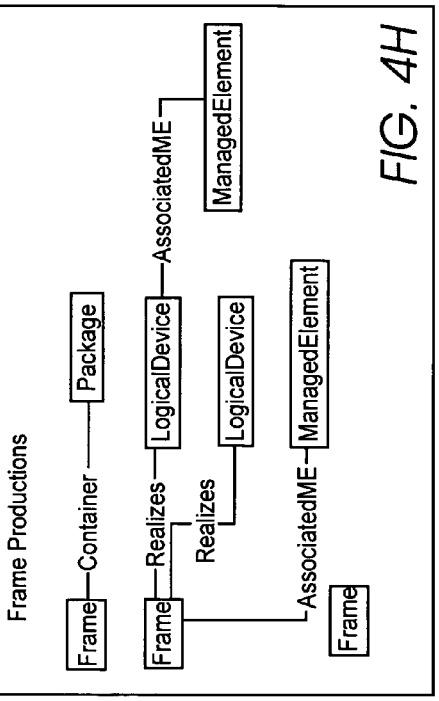

FIG. 4F shows an embodiment of Card productions, which in ABNF format are defined as:

```
Card = "CIM_Card" "/" CardOnCard
Card =/ "CIM_Card" "/" Container
Card =/ "CIM_Card" "/" Realizes
Card =/ "CIM_Card" "/" AssociatedME
Card =/ "CIM_Card"
CardOnCard = "CIM_Card"
CardOnCard =/ "CIM_Card" "/" AssociatedME
```

Figure 4G:
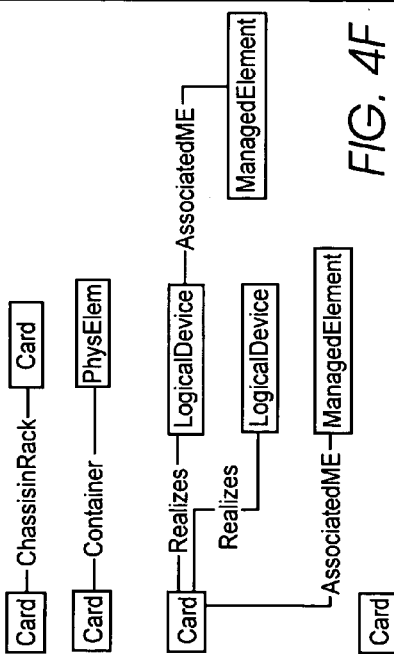

FIG. 4G shows an embodiment of Package productions, defined in ABNF format as:

```
Package = "CIM_ Package " "/" Container
Package =/ "CIM_ Package" "/" ConnectorOnPackage
Package =/ "CIM_ Package" "/" PackagedComponent
Package =/ "CIM_ Package" "/" Realizes
Package =/ "CIM_ Package" "/" AssociatedME
Package =/ "CIM_ Package"
```

Figure 4H:
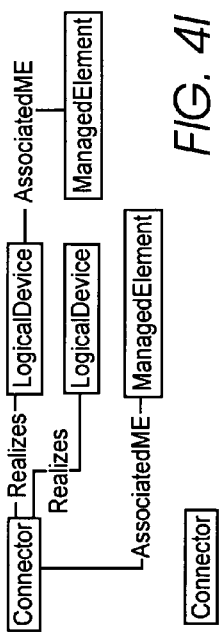

FIG. 4H shows an embodiment of Frame productions, defined in ABNF format as:

```
Frame = "CIM_Frame" "/" Container
Frame =/ "CIM_Frame" "/" Realizes
Frame =/ "CIM_Frame" "/" AssociatedME
Frame =/ "CIM_Frame"
```

Figure 4I:
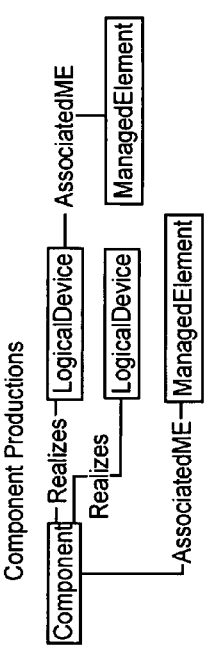

FIG. 4I shows an embodiment of Connector productions, defined in ABNF format as:

```
ConnectorOnPackage = Connector
Connector = "CIM_ Connector " "/" Realizes
Connector =/ "CIM_ Connector " "/" AssociatedME
Connector =/ "CIM_ Connector "
```

Figure 4J:
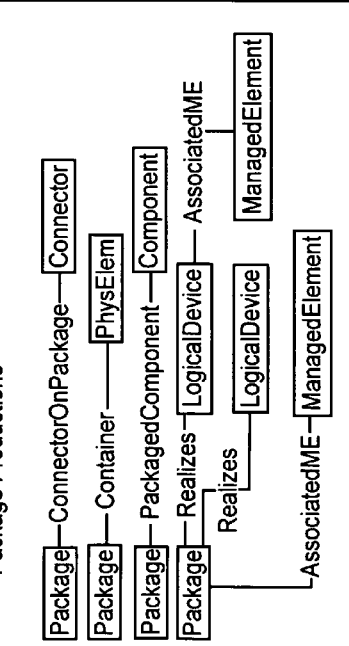

FIG. 4J shows an embodiment of Component productions, defined in ABNF format as:

```
PackagedComponent = Component
Component = "CIM_ Component " "/" Realizes
Component =/ "CIM_ Component "
Component =/ "CIM_ Component" "/" AssociatedME
```

MAPs 112, 126 often have limited processing resources, while being required to perform functions similar to a CIM Server. MAPs 112, 126 are not required to support CIM Operations over HTTP, but in other respects MAPs 112, 126 perform many of the functions of a CIM Server including interacting with clients via management console 134 or scripts, and instrumentation 122. Also, MAPs 112, 126 store information regarding managed elements 102 in metadata tables 138.

Object and Relationship Tables

In addition, in CIM environments using CIM Operations over HTTP, a client must make repeated remote operation calls to determine how instances of managed elements 102 are related to one another. This is often very time-consuming, especially if the object space is large. To help solve this problem, metadata tables 138 can be used to cache association information along with the information typically stored in metadata tables 138 so that a complete instance graph is always available. Thus, no calls are necessary to determine how or if a managed element 102 is associated to another. A remote operation is only necessary to retrieve or set property information or to invoke a method.

Further, information cached in MAP 126 may be uploaded to another client to provide an aggregated view of a data center. For instance, consider several MAPs 112, 126 each managing a single rack, such as a blade system with multiple virtual systems, and several MAPs 112, 126 each managing one or more systems, and perhaps several more MAPs 112, 126 in each of the multiple stand alone systems in the data center.

MAPs 112, 126 have separate and distinct namespaces. The aggregating client, such as an OpenView system available from Hewlett-Packard of Palo Alto, Calif., can upload cached information from each of the MAPs 126 in the data center to provide a comprehensive view of the data center. Since the namespace is hierarchical, there would be no namespace collisions even though the instance names are not unique, as long as the individual MAP namespace is stored under a unique node name.

The ability to provide a single view of an entire data center provides the functionality necessary to support an infrastructure management system, such as an OpenView system. Further, data may be viewed in a number of different ways. A fully connected instance association graph can be used to render data center topology or answer questions such as: "If a power supply fails, which central processing unit (cpu) is going down?" "If a power sensor is over threshold, which cpus are affected, which applications are running and where can these applications be moved?"

In some embodiments, metadata tables 138 are optimized by storing each CIM string once and leveraging User Friendly class and instance Tags (UFcT, UFiT). The instance tag naming rules require that an index, such as an integer value, be added to the UFcT to form an UFiT and that the index must be unique within its immediate container.

Referring to FIGS. 5A-5H, examples of metadata tables 138 (FIG. 1) are shown including MAP table 500, System table 510, Instance table 520, Association table 530, Class Name table 540, Property Name table 550, Association roles table 560, and Property Provider table 570.

The information in the embodiment of MAP table 500 shown includes MAP name, protocols/protocol versions supported, CIM versions supported, and object manager namespace handle. MAP table 500 can be included in a CIM class(es) representing MAP 112, 126 and treated as another CIM instance. The object manager namespace handle can be used with the instance's key in Instance table 520 to construct CIM Object References.

System table 510 can include information regarding all the systems MAP 112, 126 is managing. In the embodiment shown, System table 510 includes a unique index key, a System UFT, a System Type key, a pointer to the managed system's instance table, and an optional Boolean value to signify if the system is real or virtual. If a system is Partitioned, the system is by definition virtual. If MAP 112, 126 never manages partitionable systems, this field is not necessary. For many operations, storing information noting whether a system is real or virtual will prove more efficient than examining links in an instance's association table to find the existence of a HostedDependency.

The System Type Key can be used to index into a System Type table (not shown) that contains information about the physical architecture of the system such as simple stand alone system, single rack blade, multi-rack blade, Cluster, etc.

The System Type Key can also include information about MAP coverage, for example, to denote a racked blade implementation with a separate MAP 112, 126 in every blade. Such information can be used to know how to parse a target name. In the case where a single blade (or cell) is managed by a dedicated MAP 112, 126, e.g. the MAP's namespace only contains instances for its chassis. Parsing process 300 (FIG. 3) can use the information in a system's Instance Table 520 to find the bladeX MAP 112, 126 and redirect a locator such as a Uniform Resource Locator (URL) to MAP 112, 126. All MAPs 112, 126 in the system 100 know each other's access points. That is, every System Table 510 shows the name and type of a managed system. Every Instance table 520 contains a pointer to the other MAPs 112, 126 needed to complete a User request. In this way, a User can connect to any MAP 112, 126 to get information about any of blades or cells in the system without a lot of complicated processing. Metadata tables 138 also provides for efficient memory management because each MAP 112, 126 only needs to store information about its own instance. If a MAP 112, 126 is not available or the information is not available, a proxy MAP 112, 126 will return an error, no data, timed out, not supported, etc. The master MAP 112, 126 will pass the message along to the User. Provider table 570 can be used to store additional information about an auxiliary MAP 112, 126.

Instance table 520 includes information about all the instances that are known for a particular system, including a unique key for each instance, a key to the instance's class name, the instance's user friendly name, a list of the instance's CIM key values, a pointer to the instance's property provider, and a pointer to the instance's Association table. There is a single instance table 520 for each managed element 102. Provider Key indexes into Provider table 570 to get to the provider 124 or 132 executable and other pertinent information about the associated instrumentation 122. In a distributed MAP implementation across multiple servers 108, the Property Provider can be a MAP 112, 126.

Class Name table 540 is indexed with Class Name Key, which stores the UFT and CIM Object Reference for each class.

The CIM Key string in Instance table 520 can be used to construct a CIM Object Reference pathname. Caching the CIM Object Reference provides the translation from UFTs to CIM Object References to support interaction with both CLP and Web Based Enterprise Management (WBEM) facilities.

Association table 530 can include information about a particular instance's associations such as a unique key for each association, the class name key index of the association, the user friendly name for this association instance, a pointer into the instance table to locate the associated instance, the target instance's role in the association, and a pointer to the association's property provider if the association has additional properties. If associations span server systems 108, then it is necessary to add foreign system information. The HostedDependency association can be used to connect real resources with virtual resources. The association table 530 can be used to construct physical topology views, relate virtual resources to real resources, aggregate logical device information; combine LogicalDevice and their PhysicalElements, find related firmware, product information, capabilities, settings, services, managed access points, and other suitable functions.

Instance retrieval can be made by index or class type. Association retrieval can be based on instance id (index in instance table) or class type. Most association queries begin with one instance and ask a question such as [what ? is associated with this instance], or [where ? may be AssociatedPowerSupply, ElementSettingData, ElementSoftwareIdentity, RunningOS, InstalledOS, or any number of supported CIM associations]. A table look up routine can be used to search the Index Key column in association table 530 to locate the desired association and records all the matches where the instance ID is in the first or second column. The position of the instance ID in either column will tell what the role of each instance is in that particular association instance.

To get all the instances that an object is associated with, the matches in column 1 and column 2 of the association table 530 can be determined. Again, Index Key column in association table 530 provides information regarding the kind of association, and the positions of the related instances in columns 1 and 2 reveal their respective roles.

To follow an association path, for instance, to answer the question of what is contained in rack1, one begins the search in column1 of Association table 530 because rack1 is the container and therefore in the Group or Antecedent role. All the hardware contained in the rack will have ChassisInRack or Container association with rack1. Next, for each chassis type returned in the first retrieval one does a nested retrieval of all the instances associated with the chassis; PackageInChassis, Container; for each Package retrieve all the ConnectorOnPackage, PackagedComponent, Container. Such a graph traversal is guaranteed to terminate at a leaf instance.

At which point, the search recurses to the next chassis in the rack until all the branches have been walked. This traversal pattern along with the location information can provide the necessary information to render a physical topology in most cases. For more complex topologies, a Location property on the association can be used. Traditionally in CIM, the properties for specifying a location include a free-form text string that describes the placement of a managed element 102, such as slot information on a hosting board, mounting site in an equipment rack, a position relative to stationary elements in a container 104, or latitude and longitude information, among others.

Class Name table 540 includes information about CIM classes, including a unique key for each supported UFT and the corresponding CIM class name.

Property Name table 550 includes information about the properties of supported CIM classes, including a unique key for each property within the scope of a class, a CIM Name for the property, and a UFT for the property. If property information is to be cached in a Property instance table, then data type information is stored as well and a Data Type table can be used to map the data type enumerator with data type information.

Property Name table 550 allows programming logic to convert a user friendly name into a CIM parameter name to pass to a Provider 124 or 132 and instrumentation 122 and provides similar translation for transmitting Provider results to the user.

Association Roles table 560 provides information about the roles that an instance may be assigned in a particular CIM association, including a unique key (integer) for each supported CIM association and a string value of the role. Information in Association Roles table 560 can be used to develop programmatic logic to traverse associations by indicating, for example, the dependent or contained member. The role provides directional and containment information that can be used to construct a topological view of the entire system or any subsystem, such as storage or power systems.

Property Provider table 570 includes information about a particular property provider including a unique key for each provider 124 or 132 and a pointer to the provider's executable. Other useful information about the nature of the provider 124 or 132 can also be included. Providing a separate table for Provider executable location pointers avoids redundancy in Instance tables 520.

Server 108 and management platform 106 can be embodied in any suitable computer-processing device that includes memory for storing and executing logic instructions, and is capable of interfacing with other processing systems via a network. Various input/output devices, such as keyboard and mouse (not shown), can be included to allow a user to interact with components internal and external to server 108 and management platform 106.

Additionally, server 108 and management platform 106 can be embodied in any suitable computing device and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions executed by server 108 and management platform 106 can be stored on a computer readable medium, or accessed by server 108 and management platform 106 in the form of electronic signals. Server 108 and management platform 106 can be configured to interface with each other, and to connect to an external network, via suitable communication links such as any one or combination of T1, ISDN, or cable line, a wireless connection through a cellular or satellite network, or a local data transport system such as Ethernet or token ring over a local area network. The logic modules can be independently implemented or included in one of the other system components. Similarly, other components have been discussed as separate and discrete components. These components may, however, be combined to form larger, smaller, or different software modules or structures, integrated circuits, or electrical assemblies, if desired.

While the present disclosure describes various embodiments, these embodiments are to be understood as illustrative and do not limit the claim scope. Many variations, modifications, additions, and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

In the claims, unless otherwise indicated the article "a" is to refer to "one or more than one".

We claim:

1. A machine-readable storage medium storing computer-executable instructions that, when executed by a processor, cause the processor to:
   determine a physical location of at least one managed element using a property of the at least one managed element,
   wherein the managed element is assigned a unique name within a container and the property specifies a value that indicates the physical location of the managed element within the container,
   wherein the value is provided in format that is standardized for the container;
   wherein the value is provided in a text string of the property.

2. The storage medium of claim 1, wherein the value includes X, Y, and/or Z coordinates of the at least one managed element, and the coordinates indicate a spatial location in the container.

3. The storage medium of claim 2, wherein a zero coordinate is located in a rear lower left hand corner of the container and the position of the at least one managed element is confined to positive x, y, z axes.

4. The storage medium of claim 2, wherein:
   one or two of the coordinates are omitted for locations with one or two dimensions.

5. The storage medium of claim 2, wherein one of the coordinates is omitted when all managed elements within a particular container have the same one of the coordinates for the container.

6. The storage medium of claim 2, wherein the coordinates are used as divisors in unit ratios of corresponding axes.

7. The storage medium of claim 2, wherein the coordinates provided in the property are used as indices to the location in the container.

8. The storage medium of claim 1 wherein the property is defined as part of a Common Information Model (CIM).

9. The storage medium of claim 1, further comprising:
   logic instructions executable on the computer processor and operable to:
   recognize a CIM Location Format property that defines a format of a CIM LocationWithinContainer property.

10. The storage medium of claim 1, further comprising a computer processor coupled to execute the logic instructions.

11. A method comprising:
automatically locating a managed element in a data center, wherein the managed element is located in a container, and the container is configured to store managed elements in X, Y, and/or Z coordinates, and the X, Y, and/or Z coordinates are accessible in a property of the managed element; the property is defined as part of a Common Information Model (CIM);
automatically recognizing the coordinates in a text string in CIM's LocationWithinContainer property.

12. The method of claim 11 wherein the coordinates used for the containers are standardized to allow diverse systems to locate the managed element in a consistent manner.

13. The method of claim 11, wherein a zero coordinate is located in a corner of the container and the position of the managed element is confined along X, Y, and/or Z axes.

14. The method of claim 11, wherein one of the coordinates is omitted when all managed elements within a particular container have the same one of the coordinates for the container.

15. The method of claim 11, wherein the coordinates are used as divisors in unit ratios of corresponding axes.

16. The method of claim 11, wherein the coordinates provided in the property are used as indices to the location in the container.

17. A machine-readable storage medium storing computer-executable instructions that, when executed by a processor, cause the processor to:
map a user-friendly tag in a command line to a CIM instance of a managed element; and
access a CIM property for the CIM instance that defines a location for the managed element in a standardized format,
wherein the standardized format is usable by different vendors of data center management products.

18. The storage medium of claim 17, further comprising:
at least one data table that includes information regarding at least one of the group consisting of: instances of managed elements, associations between the managed elements, user-friendly tags and corresponding CIM class names for the managed elements, properties of the managed elements including user-friendly tags and corresponding CIM names for the properties, and pointers to executable instructions provide the properties of a managed object upon request.

19. The storage medium of claim 17, further comprising: a hierarchical profile of a CIM Schema that defines specific paths to end node instances based on a CIM containment model with constraints to enforce instance uniqueness within a container.

20. The storage medium of claim 17, further comprising:
a logical profile including:
at least one managed element of the group consisting of: LogicalDevice, ComputerSystem, Service, PhysicalElement, SystemSpecificCollection, and ServiceAccessPoint; and
associations between managed elements can include at least one of the group consisting of: Hosted Dependency, Hosted Service, System Device, Hosted Access Point, Hosted Collection, Computer System Package, and Realizes.

21. The storage medium of claim 17, further comprising:
a physical profile wherein a Rack may contain 0 . . . n Chassis; a Chassis may contain 0 . . . n Packages; a Package may contain 0 . . . n Components, Connectors, or PhysicalElements, and a PhysicalElement Realizes a LogicalDevice so any PhysicalElement by association may 'contain' a Logical Device.

22. The storage medium of claim 17, further comprising:
a metadata repository that includes information typically stored in a CIM instance repository.

23. The storage medium of claim 17, further comprising:
a set of grammar rules defining how managed elements are associated to one another.

24. The storage medium of claim 17, further comprising:
an index included in the user-friendly tags (UFTS), wherein the index is unique for each instance of the managed elements of the same type within a container.

25. The storage medium of claim 17, further comprising:
a command set for managed elements including at least one of the group consisting of: a command to apply a Setting Data instance to a target; a command to bring up a Server system; a Reset Command; a Power Command; a Halt Command to shut down a target managed element instance; a Show: Instance Properties Command, which returns all the supported properties of a target managed element instance; a Show: instance names Command, which returns all the names of a specified target type in a CIM instance; a Create Command, which creates an instance of the target type; a Remove Command, which removes an instance of a managed element; and a Subscribe Command to register to receive indications of specified events.

26. The storage medium of claim 17, further comprising:
a user-friendly class tag (UFcT) that is defined for each class used in a profile to provide a simple short user friendly synonym for specific a CIM class; and
a user-friendly instance tag (UFiT) based on an instance's UFcT and the index.

27. The storage medium of claim 17, wherein more than one unique alias name can be specified for an instance of a managed element.

* * * * *